No. 815,292. PATENTED MAR. 13, 1906.
M. HEGBOM.
SUPPORTING MEANS FOR METALLIC LATHS.
APPLICATION FILED JULY 30, 1904.

Witnesses
J. W. Angell.
W. W. Witherbury

Inventor
Marselius Hegbom
by Charles O. Rice Atty.

UNITED STATES PATENT OFFICE.

MARSELIUS HEGBOM, OF CHICAGO, ILLINOIS, ASSIGNOR TO FREDERIC VOSS, OF CHICAGO, ILLINOIS.

SUPPORTING MEANS FOR METALLIC LATHS.

No. 815,292. Specification of Letters Patent. Patented March 13, 1906.

Application filed July 30, 1904. Serial No. 218,855.

*To all whom it may concern:*

Be it known that I, MARSELIUS HEGBOM, a citizen of the United States, and a resident of the city of Chicago, in the county of Cook and State of Illinois, have invented certain new and useful Improvements in Supporting Means for Metallic Laths; and I do hereby declare that the following is a full, clear, and exact description of the same, reference being had to the accompanying drawings, and to the letters of reference marked thereon, which form a part of this specification.

Heretofore in attaching reticulated structures—such as wire, expanded or sheet metal laths—staples have sometimes been used if the studs or joists are of wood. If the studs are metallic, loops are provided thereon which project through the meshes of the lath and in which is inserted a lath-nail acting to bind the structures together. In either construction considerable time is required for driving the staples or for inserting nails for retaining the laths in position. The latter construction is defective, inasmuch as the loops which usually are constructed integrally with the metal studs are frequently bent down in handling and transportation, closing the same from insertion of the nail.

The object of my invention is to afford a novel stud and simple and easily-secured fastening means of light weight, but of great strength, which acts to rigidly bind the structures together.

The invention consists in the matters hereinafter described, and more fully pointed out and defined in the appended claims.

Figure 1:
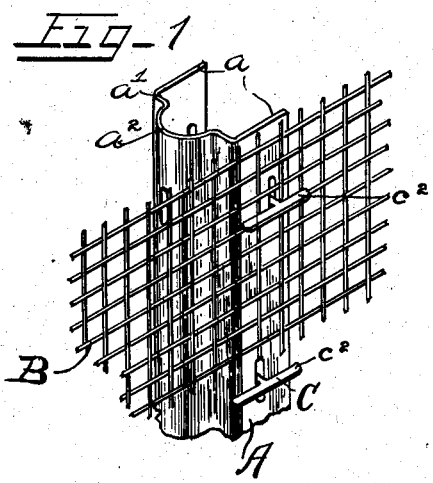
Figure 2:
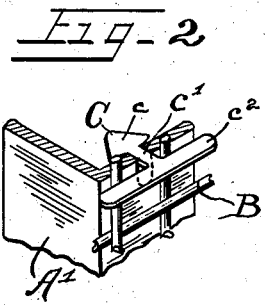
Figure 3:
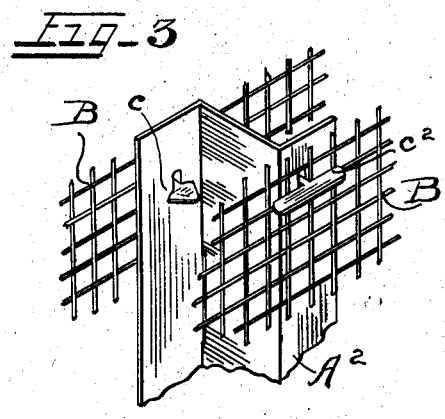
Figure 4:
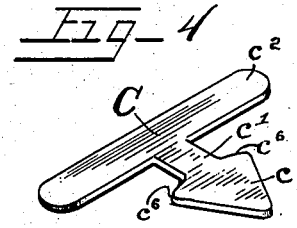
Figure 5:
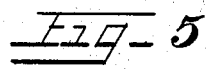
Figure 6:
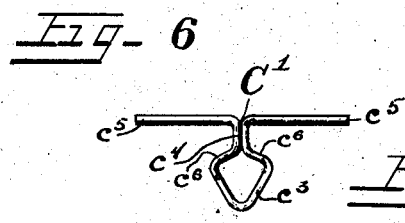
Figure 7:
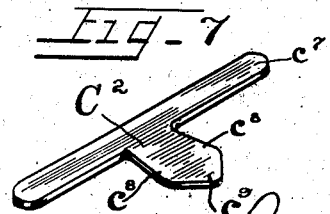

In the drawings, Figure 1 is a perspective view of a stud and fastening means embodying my invention, showing the same in use. Fig. 2 is an enlarged section of an angle-iron stud taken just above the fastener. Fig. 3 is a view similar to Fig. 1, showing the stud in the form of a Z-bar having lath secured on each side the same by means embodying my invention. Fig. 4 is an enlarged perspective view of the fastener. Fig. 5 is a perspective view showing the fastener in position for insertion into a stud. Fig. 6 is a plan view of a fastener constructed of wire. Fig. 7 is an enlarged perspective view of another form of fastener.

As shown in said drawings, the studs may be any preferred form of metal studs, such as angle or Z bars, channels, or other forms of structural metal having longitudinally-elongated slots in the flanges or webs, or both, thereof, adapted to receive the fasteners whereby the lath is secured in place. The stud A (shown in Fig. 1) is a desirable form and comprises parallel flanges $a$, connected at corresponding edges by an integral web $a'$, which is provided with a central longitudinal bend or bead $a^2$, in which are provided elongated apertures, such as before described, thus adapting the wire, expanded metal, or sheet-metal lath B to be secured upon either or both of the parallel sides to the web only or to the web and one or both sides, as preferred. Said fastener (indicated as a whole by C) is stamped or cut from a sheet or plate of metal to afford a head $c$, which, as shown, is pointed and provided at its rear end with rearwardly-directed shoulders $c^6$ and is integrally connected with a transverse bar $c^2$ by a short stem or neck $c'$, which is of sufficient length to permit the head to be passed through meshes of the metal lath through the slot in the stud and be turned therein, as shown in Fig. 2. Said transverse bar $c^2$ is of a sufficient length on each side of said stem or neck to firmly engage and bind the metallic lath to the stud. In the construction illustrated in Figs. 2 and 5 angle-bars A' are shown as studs, and in the construction illustrated in Fig. 3 a Z-bar A² is shown, having wire net secured on each side of the same to afford a partition adapted to be plastered on both sides.

In the construction illustrated in Fig. 6 the fastener C' is constructed of a wire or rod bent to afford a head $c^3$, corresponding with the head $c$, shaped as before described and connected by a stem $c^4$ and having the ends $c^5$ of the wire or rod directed oppositely and affording the bar which engages outside the lath.

In the construction illustrated in Fig. 7 the fastener C² is constructed of sheet or plate metal and the stem or neck tapers outwardly from the transverse bar $c^7$ and then inwardly adjacent the outer end thereof, forming shoulders $c^8 c^8$ and a point $c^9$.

The operation is as follows: The stud, constructed as shown in Fig. 1 or of any preferred cross-sectional form, is secured in place in any suitable manner, and the wire, expanded metal, sheet-metal lath, or other analogous material is placed against the studs and the headed end of the fasteners are inserted through the lath into and turned in the slot in said stud until the plane of the head lies approximately at right angles with the greatest length of the slot. The bar $c^2$, $c^5$, or $c^7$, if the slots extend longitudinally of the stud, now lies horizontally, as shown in Figs. 1 and 2. In plastering said horizontally-extended bars $c^2$, $c^5$, or $c^6$ of the fasteners are an advantage, inasmuch as they afford a shelf or support for the plastering secured over the stud.

Any of the forms of metallic lathing, either that having small meshes used for ordinary plastering purposes or large-meshed material used in concrete constructions, may be quickly and rigidly secured upon a suitable apertured support by means of either form of the fastener of suitable size. When once secured in place, the fasteners rigidly bind the structure together and afford a support for the plaster, cement, or other plastic material used.

I have shown but one construction embodying my invention, though obviously several variations are possible. I therefore do not purpose limiting myself in this application for patent otherwise than necessitated by the prior art and stated in the claims, as obviously many details of construction may be varied without departing from the principles of my invention.

I claim as my invention—

1. A metallic fastener of the class described, comprising a bar, a centrally-disposed neck extending from one edge thereof, and a head on the outer end of said neck provided with shoulders directed longitudinally of the bar.

2. A fastener of the class described comprising a straight bar, a laterally-offset head connected integrally therewith near its center and shoulders on opposite sides of said head at a distance from the bar.

3. A fastener of the class described comprising a straight bar, a laterally-directed non-resilient stem thereon intermediate its ends, a head on said stem and rearwardly-directed shoulders on the head.

4. As an article of manufacture, a sheet-metal bar, a laterally-directed neck or stem on the edge thereof and oppositely-disposed projections or shoulders on each side of said stem extending approximately parallel with the bar.

5. A metallic stud of the class described, having flat faces one of which is provided with a plurality of slots therethrough and fastening means comprising a bar, a laterally-disposed head and a narrow stem connecting said head and bar and adapted to extend through said slots.

6. A metallic stud, comprising a sheet or strip of metal bent to afford parallel flanges each having arranged at intervals throughout its length a plurality of slots and a fastener comprising a bar having a transversely-directed flat head thereon adapted to be inserted through said slots and a stem connecting the head with the bar of a width to permit the fastener being turned in the slot in which engaged.

7. A stud for the purpose specified comprising a sheet of metal bent to afford parallel flanges connected at corresponding edges by an integral web, closely-arranged elongated apertures in said flanges and a fastener comprising a bar and a head each adapted to engage on one of the sides of said flanges and a narrow neck connecting the same and adapted to permit the head and bar to be turned transversely of the slot.

8. A stud comprising a strip or sheet of metal bent to afford parallel flanges and an integral connecting-web uniting corresponding edges thereof, a longitudinal outwardly-turned bead at the middle of said web, said flanges and bead having longitudinally-extended elongated apertures therethrough at close intervals in the length of the stud and adapted to receive fastening means for metallic laths or the like whereby said stud is capable of affording a support for laths on either side of the same or on the bead.

9. The combination with a metallic stud having elongated slots therein of metallic lath secured against the stud fastening means therefor comprising a shouldered head adapted to engage the edges of said slots, a transverse bar and a short integral neck connecting the same, and adapted, when the head is inserted through the mesh and the slot, to be turned at an angle with the stud and rigidly binding the lath between the bar and stud.

10. In a device of the class described the combination with a metallic stud having a plurality of elongated apertures therein, fastening means adapted to engage in said apertures comprising a back bar, a neck centrally disposed thereon and a plurality of rearwardly-directed shoulders on said neck adapted to engage the margins of said apertures and lock the fastening means to the stud.

In witness whereof I have hereunto subscribed my name in the presence of two subscribing witnesses.

MARSELIUS HEGBOM.

Witnesses:
C. W. HILLS,
W. W. WITHENBURY.